United States Patent [19]

Smith et al.

[11] Patent Number: 5,392,813

[45] Date of Patent: * Feb. 28, 1995

[54] INTEGRAL BLEED SYSTEM FOR VALVE

[75] Inventors: Gordon M. Smith, Brookshire; Hans M. Van Der Wiel, Fulshear, both of Tex.

[73] Assignee: Johnston Pump/General Valve Inc., Brookshire, Tex.

[*] Notice: The portion of the term of this patent subsequent to Jan. 13, 2009 has been disclaimed.

[21] Appl. No.: 672,713

[22] Filed: Mar. 19, 1991

[51] Int. Cl.⁶ .............................................. F16K 5/02
[52] U.S. Cl. ..................................... 137/599; 251/283
[58] Field of Search ................ 137/599, 875; 251/188, 251/283

[56] References Cited

U.S. PATENT DOCUMENTS

| | | | |
|---|---|---|---|
| 2,726,672 | 12/1955 | Doster | 137/599 X |
| 3,060,964 | 10/1962 | Bagwell | 137/599 |
| 3,135,284 | 6/1964 | Magos | 137/599 X |
| 3,180,351 | 4/1965 | Wolfensberger | 251/283 X |
| 3,343,802 | 9/1967 | Schulwerve | 251/283 X |
| 4,848,401 | 7/1989 | Devilleger et al. | 137/599 |

Primary Examiner—John C. Fox
Attorney, Agent, or Firm—Leonard Tachner

[57] ABSTRACT

A unified block integral bleed system for use with valves such as plug-type valves wherein pressure release flow occurs through a manifold port mounting arrangement which accesses upstream, downstream and body cavity portions of the valve and provides atmosphere taps as well without external piping. Such a manifold integral body bleed system provides internal flow channels and is preferably configured as the bonnet of the valve but could also be configured for example as the lower plate of the valve. In fact, any valve component which provides inherent access to the upstream and downstream throats and the central body cavity could serve as the bleed system manifold component as well.

10 Claims, 11 Drawing Sheets

INTEGRAL BLEED SYSTEM FOR VALVE

BACKGROUND OF THE INVENTION

1. Field of the Invention

The present invention relates generally to valves of the type which may be used to regulate the flow of fluids therethrough and more specifically, to an integral bleed system for such valves for permitting the selective release of pressure.

2. Prior Art

The design of many valves in the prior art permits pressure trapped in the body cavity to be relieved by means of pressure relieving devices. Such devices are designed to permit hydraulic communication of the fluid trapped in the body cavity to the upstream, downstream or external area of the valve body. At first glance this appears to be a relatively simple task, but upon further analysis it will be seen that this task is indeed quite overwhelmingly complex. As a result, prior art solutions have also been complex as well as clumsy and potentially dangerous. The complexity of the use of external pressure relieving devices stems primarily from the large array of variations that must be provided in a conventional bleed system and the number of parameters which can affect the nature of the bleed system in prior art valves. For example, the material of which the bleed systems are made will usually depend upon the nature of the media. Thus for example there may be two basic materials depending upon whether the media is caustic or not caustic. Material properties of external valve bleed systems will also vary as a result of differences in the temperature of the media and the viscosity of the media. There will also be variations in the geometry of end connections such as whether such connections are threaded or compression fittings, or pipe threads or unions and the like. Another significant variable is size. Variations in the bleed system configuration will depend upon the size of the pipes and tubes and the pipe schedules and the thicknesses of the tubes and the pipes. Other variations stem from variations in the manufacturer's specifications for valves. The sealing material will also result in variations necessary in the pressure relieving devices of the bleed system. Different relief valve requirements are also parameters which affect the complexity of such bleed systems. Check valve crack pressures also affect variations and manual valve styles with and without locking devices add additional parametric permutations. These variations quickly add up. Just those mentioned above represent over one million possible permutations. As a result, a large part of inventory control, purchasing, designing, and design control for valve manufacturers can be directly attributed to the relatively secondary issue of the bleed system.

Prior art pressure-relieving bleed systems are clumsy because once they are installed they require numerous joints which can leak. In addition, the bleed system normally protrudes from the valve body and as a result, handling and shipping becomes more difficult. Once installed, the bleed system with its required maintenance access area, virtually doubles the original valve installation dimensional requirements. The dangers of an external pressure relieving bleed system of the prior art stem from the fact that once the valve is installed, the relatively weak structure of the bleed system is attached to an immobilized valve and provides protruding plumbing and valves such as relief valves and the like. Such protrusions can easily be broken off creating significant dangers. A bleed system that becomes severed can create the possibility of a catastrophic failure including fire, explosion, hazardous material spills and the like.

There is therefore a significant need for an improved valve pressure-relieving bleed system which overcomes the aforementioned disadvantages of prior art bleed systems. In other words, there is a need for a bleed system that does not require a significant inventory to accommodate large variations in the parameters of such bleed systems; which does not produce a clumsy and dangerous external plumbing configuration and which reduces the possibilities of a catastrophic failure of the type described above.

SUMMARY OF THE INVENTION

The present invention meets the aforementioned need by providing an integral bleed system for valves. The integral bleed system of the present invention is implemented in its preferred embodiment by means of a manifold and cartridge components which are used instead of pipes, tees and elbows for routing fluid and using inline components for control. The principal novelty of the present invention resides in the incorporation of various bleed system hydraulic circuits into a unified manifold block which serves a concurrent function as the bonnet or lower plate or body of the valve itself. Furthermore, in the present invention, in order to communicate with the three media process pressures the invention utilizes a manifold port mounting arrangement to access upstream, downstream and body cavity regions of the valve without the use of external piping and taps. As a result, the present invention is significantly less complex and more compact as compared to prior art bleed systems and valves. The variability of parts and configurations and materials previously referred is greatly reduced along with the number of permutations that must otherwise be part of the inventory of a valve manufacturer. The probability of leaks in the bleed system is greatly reduced. The number of external joints is greatly reduced. Material management by the valve manufacturer and inventory by the valve manufacturer are also both reduced significantly. The resulting valve, including its integral bleed system, is significantly easier to handle and ship and certainly easier to install. It requires less room when installed. The likelihood of damage to the system as a result of external plumbing around the exterior of the valve is greatly reduced. The probability of mishandling in the field is minimized. Fire safety is improved, fluid handling is safer and the chances of catastrophic failures of the type previously described are significantly minimized.

OBJECTS OF THE INVENTION

It is therefore a principal object of the present invention to provide an improved bleed system for valves, the bleed system of the present invention comprising an integral component of the valve itself.

It is an additional object of the present invention to provide an integral bleed system for valves in which there are no external plumbing requirements such as found in conventional bleed systems for fluid handling valves.

It is still an additional object of the present invention to provide an integral bleed system for valves in which the bleed system functions concurrently as the bonnet or other integral portion of the valve as well as providing a manifold for relieving pressure by selective flow of fluid media between the valve body cavity and upstream or downstream throats or the external environment.

It is still an additional object of the present invention to provide a standardized manifold integrated bleed system for valves in which pressure relieving flow may be selectively provided in such a valve in a variety of alternative ways simply by installing flow control devices such as relief valves, shut-off valves and the like as well as plugs and caps for configuring such a standard manifold into the selected flow configuration.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which:

FIG. 4 comprising

DETAILED DESCRIPTION OF A PREFERRED EMBODIMENT

Figure 1:
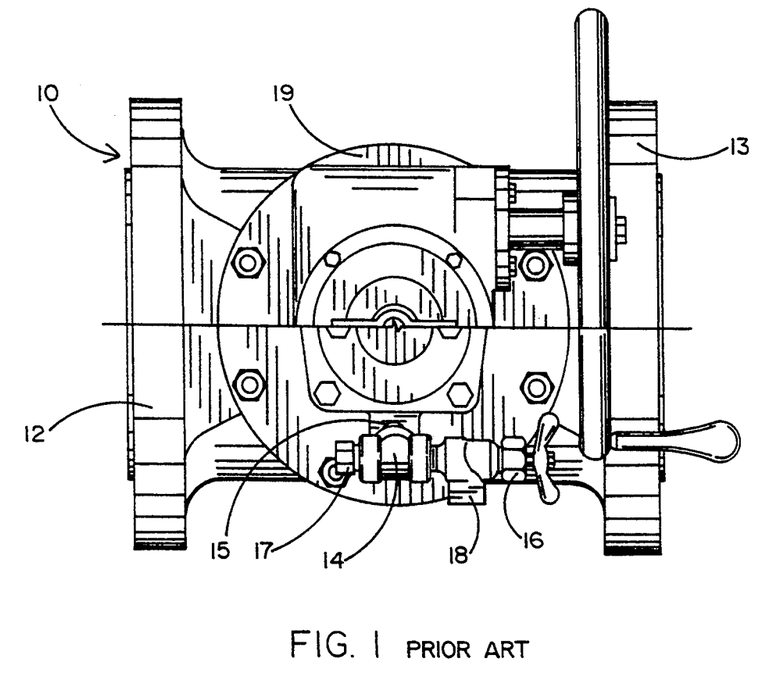
FIG. 1 is a prior art illustration of an external bleed system installed on a valve for allowing the release of pressure from the center cavity of the valve to atmosphere.

The relative advantages of the present invention may be best understood by first referring to FIGS. 1-4 which illustrate various prior art bleed systems connected to valves for pressure relieving purposes. By way of example, FIG. 1 illustrates a manual bleed discharge-to-atmosphere in a valve 10 having inlet port 12 and outlet port 13 and a central body cavity 19. As seen in FIG. 1 a manual bleed discharge system utilizes a tee 14 connected to the central cavity 19 by means of a nipple 15. The tee has a pipe plug 17 connected at one end and a bleed valve 18 connected at the other. A manual valve shut-off 16 is provided to facilitate opening and closing valve 18. The configuration of FIG. 1 allows the discharge of pressure from the central cavity to atmosphere.

Figure 2:
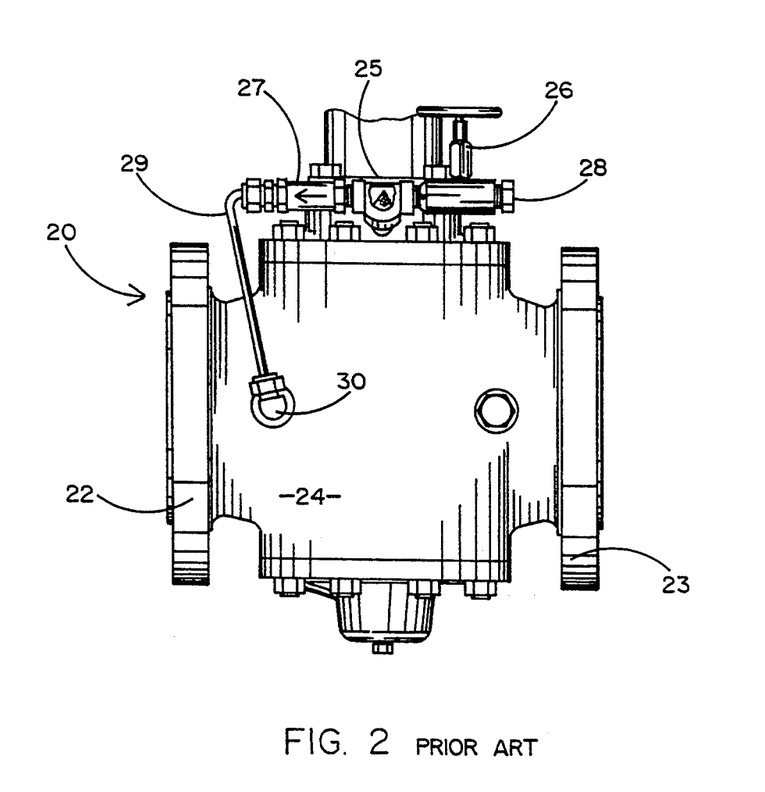
FIG. 2 is a prior art illustration of an external bleed system used in a valve to relieve pressure from the center cavity of the valve to the upstream area of the valve body.

The prior art bleed system of FIG. 2 is one which allows the relief of pressure in the central cavity of a valve 20 to the upstream throat side of the valve. More specifically as seen in FIG. 2, valve 20 is provided with an upstream flange 22 and a downstream flange 23, both extending axially from a central body cavity 24. In order to permit the relief of pressure within the central cavity to the upstream side of the valve, valve 20 is provided with a bleed system including a tee 25 one end of which is provided with a manual valve 26 and a pipe plug 28. The other end of tee 25 is connected to a relief valve 27 which is connected by tubing 29 to a check valve 30 which is, in turn, connected to a port through the upstream throat end of valve 20.

Figure 3:
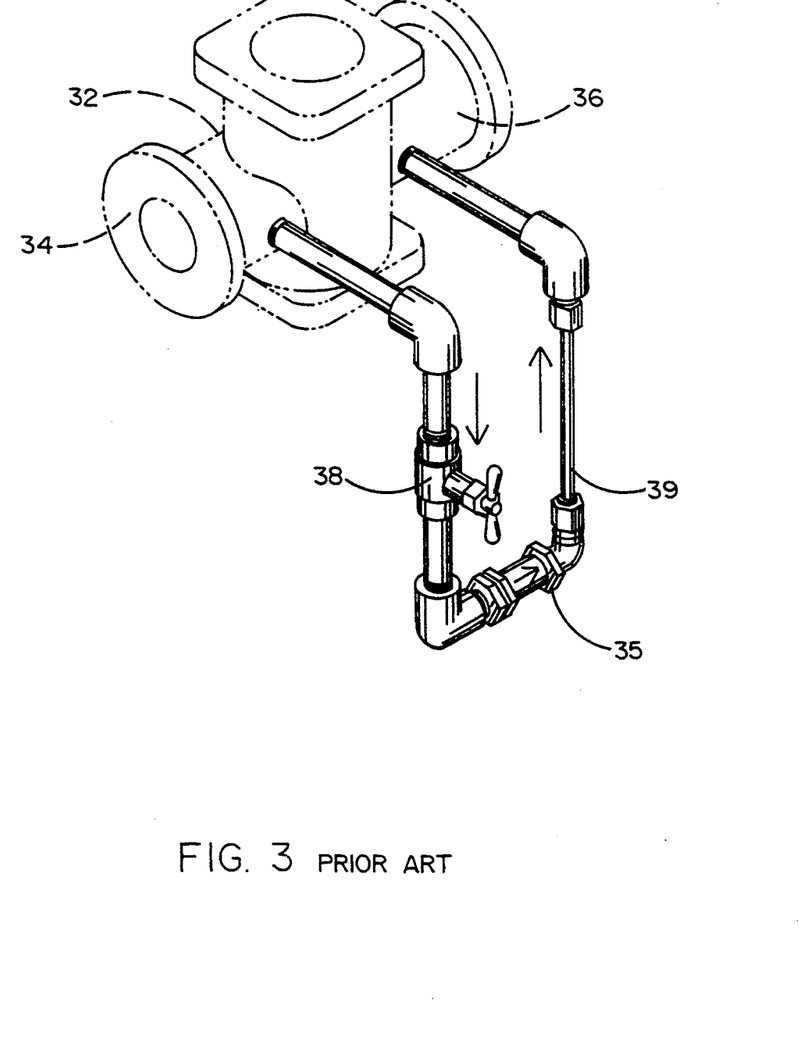
FIG. 3 is a prior art illustration of an external bleed system used in a valve to provide pressure relieving flow between the upstream and downstream areas of a valve.

FIG. 3 illustrates a relief system comprising an external bleed or bypass configuration for allowing selective flow from the upstream side of a valve 32 to the downstream side of that valve. More specifically, as seen in FIG. 3 valve 32 has an upstream throat 34 and a downstream throat 36. The upstream throat is connected by means of suitable piping to a manual valve 38 which is, in turn, connected by appropriately configured piping interface to a relief valve 35. Relief valve 35 is, in turn, connected by suitable tubes to the upstream throat. Thus the configuration of FIG. 3 permits the relief of pressure from the upstream side of valve 32 through the downstream side by opening and closing manual valve 38.

Figure 4A:
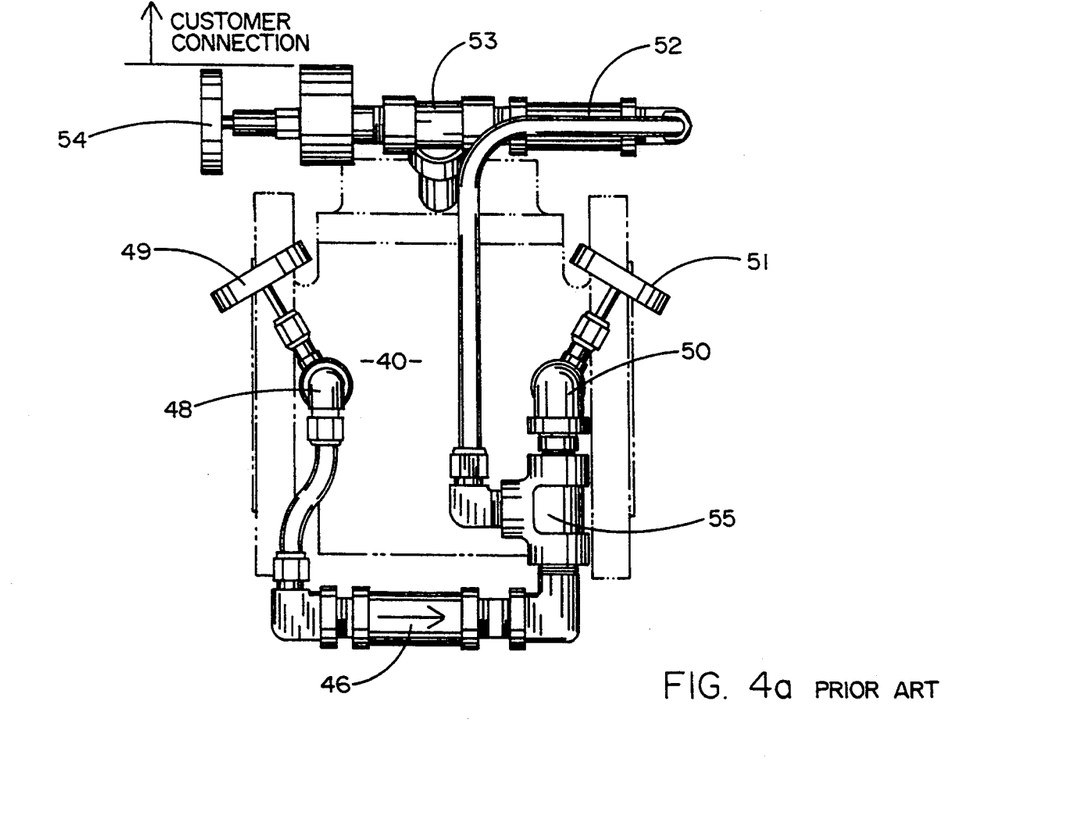
FIGS. 4a and 4b is a prior art illustration of an external bleed system in a valve wherein pressure is relieved by permitting regulated flow between the center cavity of the valve and the upstream area of the valve as well as between the upstream area of the valve and the downstream area of the valve.
Figure 4B:
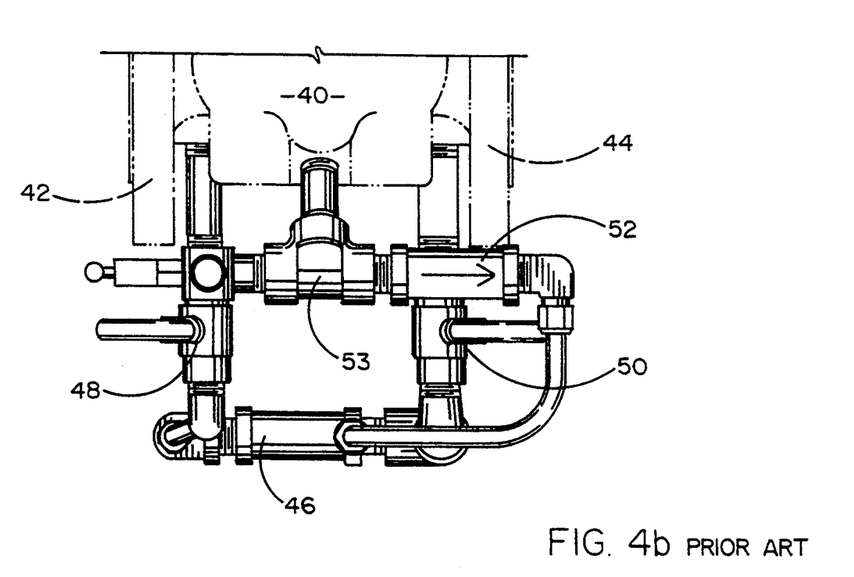
Figure 5:
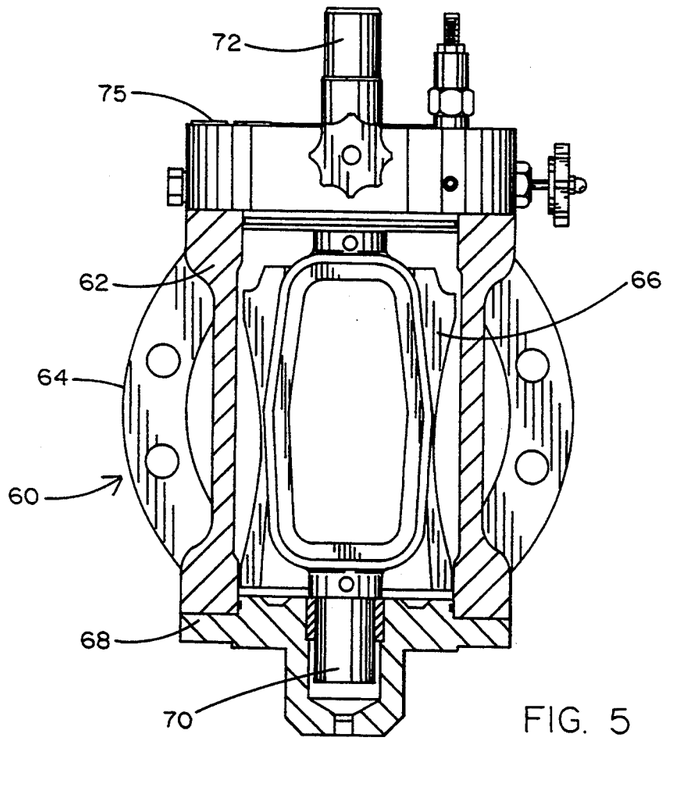
FIG. 5 is a partially cross-sectioned view of a plug-type valve having an integral bleed system of the present invention installed as the bonnet of the valve.

FIG. 4, comprising FIGS. 4a and 4b, is again a prior art illustration of a bleed system used in conjunction with a conventional valve. In the particular configuration shown in FIG. 4, the bleed system permits both center cavity to upstream pressure relief as well as downstream-to-upstream pressure relief. Both use a relatively complicated arrangement of external piping and plumbing to accomplish that purpose. As shown in FIGS. 4a and 4b, the valve 40 is provided with a downstream flange 42 and an upstream flange 44. The bleed system interfaces with the valve 40 at three discrete positions, namely, the upstream throat, the downstream throat and the central cavity of the valve 40. The downstream connection is provided with a manual valve 48 which is, in turn, connected to a check valve or relief valve 46 which is, in turn, connected to a manual valve 50. Manual valves 48 and 50 provide actuators 49 and 51 to selectively open and close those two valves. The central cavity connection of the bleed system of FIG. 4 is connected to a tee 53, one end of which is connected to a manual valve suitable for opening and closing to permit selective flow to a customer-provided connection which may for example be used for sensor purposes. The other end of tee 53 is connected to a check valve 52 which is, in turn, connected through suitable tubing to a tee 55 which interfaces with upstream manual valve 50.

Each of the various bleed system configurations of FIGS. 1–4 provides different types of pressure relief flow for different applications depending upon the source of the pressure within the valve and the location of the exit port of the bleed system. One can readily see in FIGS. 1–4 that the required plumbing to achieve these various bleed system configurations is quite complex and cumbersome and adds numerous sources of leaks and catastrophic accident to the valves to which those bleed systems are connected. Furthermore, one can readily perceive the large number of differently shaped fittings for pipes and tubes that are required to permit the bleed system plumbing to be configured in just those four exemplary illustrations of FIGS. 1–4. Thus one can readily understand that a bleed system invention which obviates all of the external plumbing shown in FIGS. 1–4 as well as complicated and cumbersome externally-installed plumbing that would be need for other similar configurations would be highly desireable. Such a bleed system would lead to significant savings as well as to a reduction in the danger of a catastrophic accident that could result from the cumbersome external configuration of such prior art bleed systems of FIGS. 1–4, as well as others.

The present invention overcomes the aforementioned disadvantages by providing an integral bleed system which may be understood initially by referring to FIGS. 5, 6a, 6b and 6c. FIGS. 5, 6a, 6b and 6c illustrate an exemplary valve 60 which is of a plug-type configuration and comprises input and output flanges 64 and 65, respectively. A valve body 62 is configured with a plug 66, the rotational position of which determines whether or not the valve is opened. The bottom of valve 60 is provided with a lower plate 68. Lower plate 68 is adapted to receive a lower trunnion 70 connected integrally to plug 66. Plug 66 also provides an upper trunnion 72. The upper trunnion extends through an upper plate or bonnet 75. However, unlike conventional bonnets, bonnet 75 serves a dual purpose. Not only is it the upper sealing plate for the valve body, it is also an integral bleed system which is configured as a rectangularly-shaped metal block that has an internal manifold with various externally accessible ports. These ports may be plugged or capped or provided with suitable devices to configure a bleed system in which pressure relief may be accomplished in a variety of different ways as will be seen hereinafter in more detail.

Figure 6A:
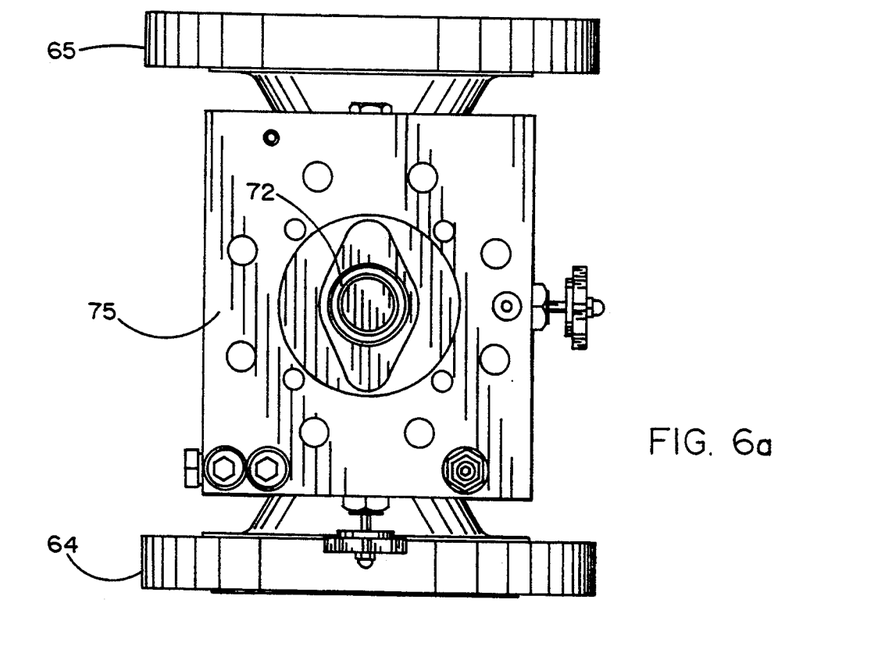
FIG. 6a is a top view of the bonnet integral bleed system shown in FIG. 5.
Figure 6B:
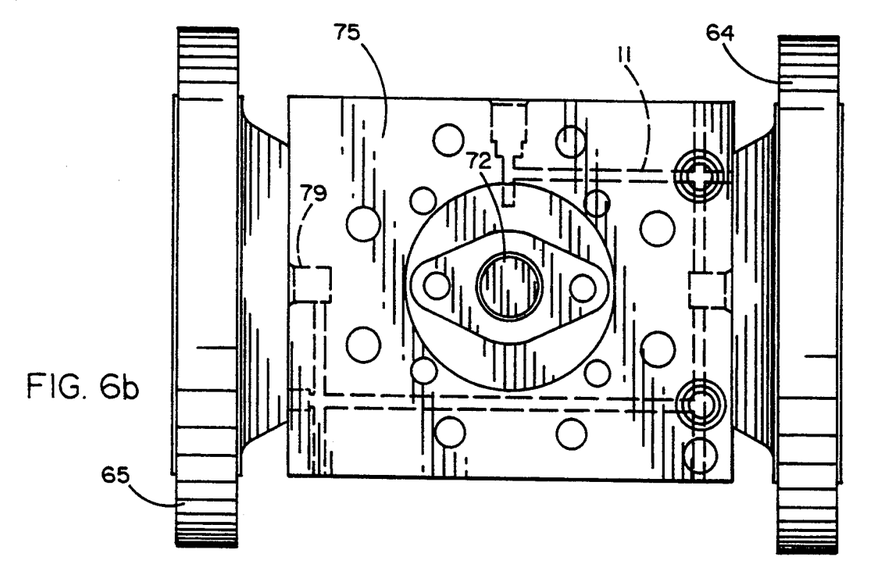
FIG. 6b is a top view similar to that of FIG. 6a but illustrating interior flow channels in dotted line format.
Figure 6C:
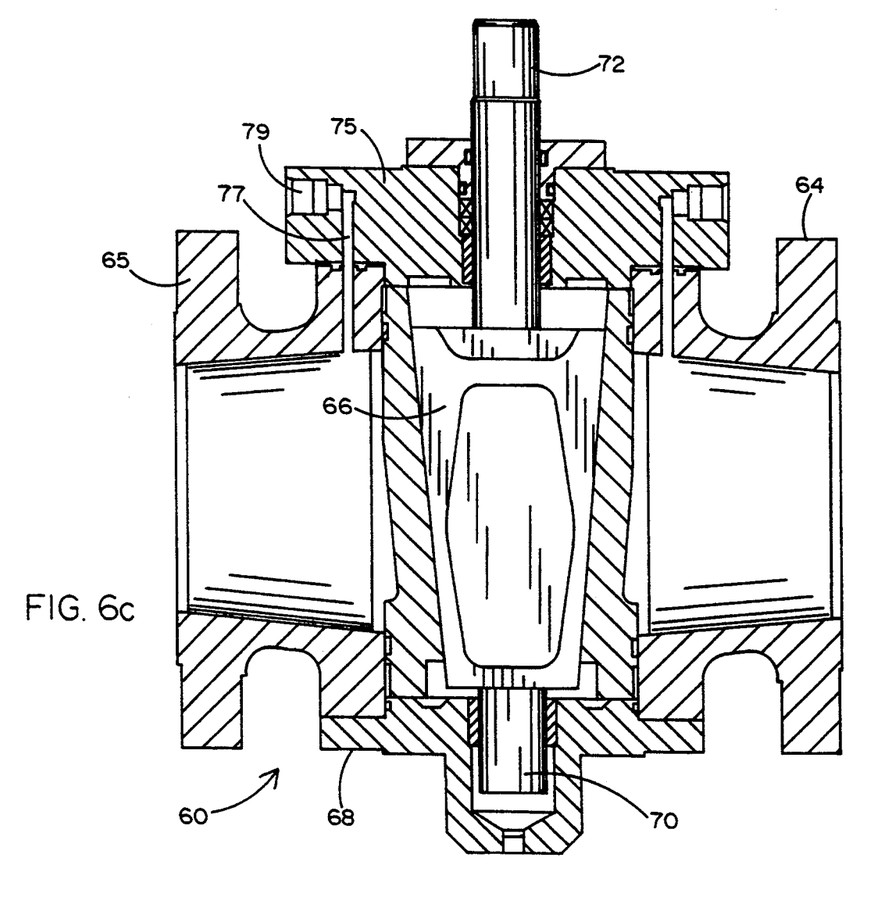
FIG. 6c is a cross-sectional view of the valve and bleed system in combination.
Figures 9, 11, 14:
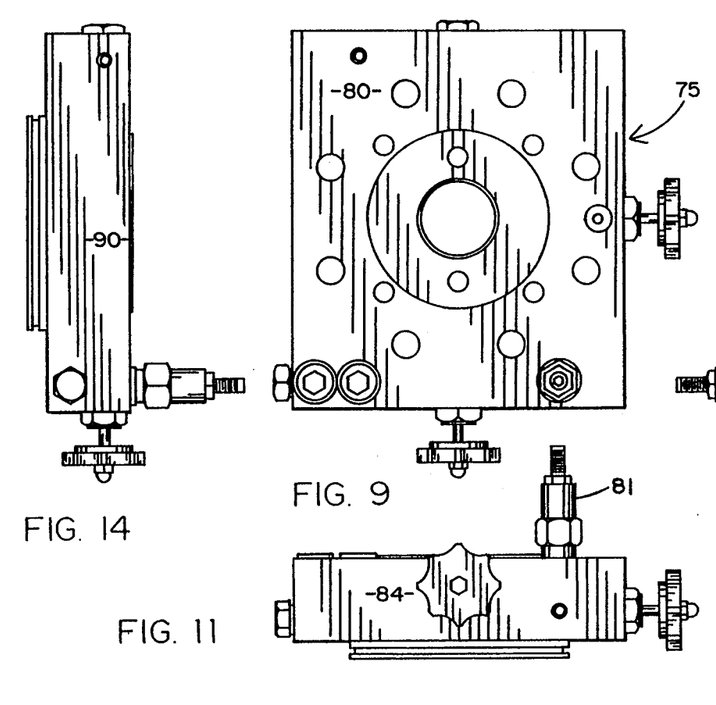
FIGS. 9-14 illustrate various elevational views of the manifold integral bleed system of the present invention shown mechanically configured in accordance with the schematic illustration of FIG. 8.

As shown best in FIGS. 6b and 6c, bonnet 75 comprises a plurality of flow channels 77 and a plurality of externally accessible ports 79 adapted for receiving at least one flow control device 81 (see FIG. 11). Two of the flow channels 77 provide integral connection to the upstream and downstream throats as seen in FIG. 6c. Another flow channel 77 is positioned for integral connection to the body cavity of the valve above the plug 66. Each of the flow channels 77 is interconnectable to the other flow channels (see FIG. 6b) as shown schematically in FIG. 7 which will now be described.

Figure 7:
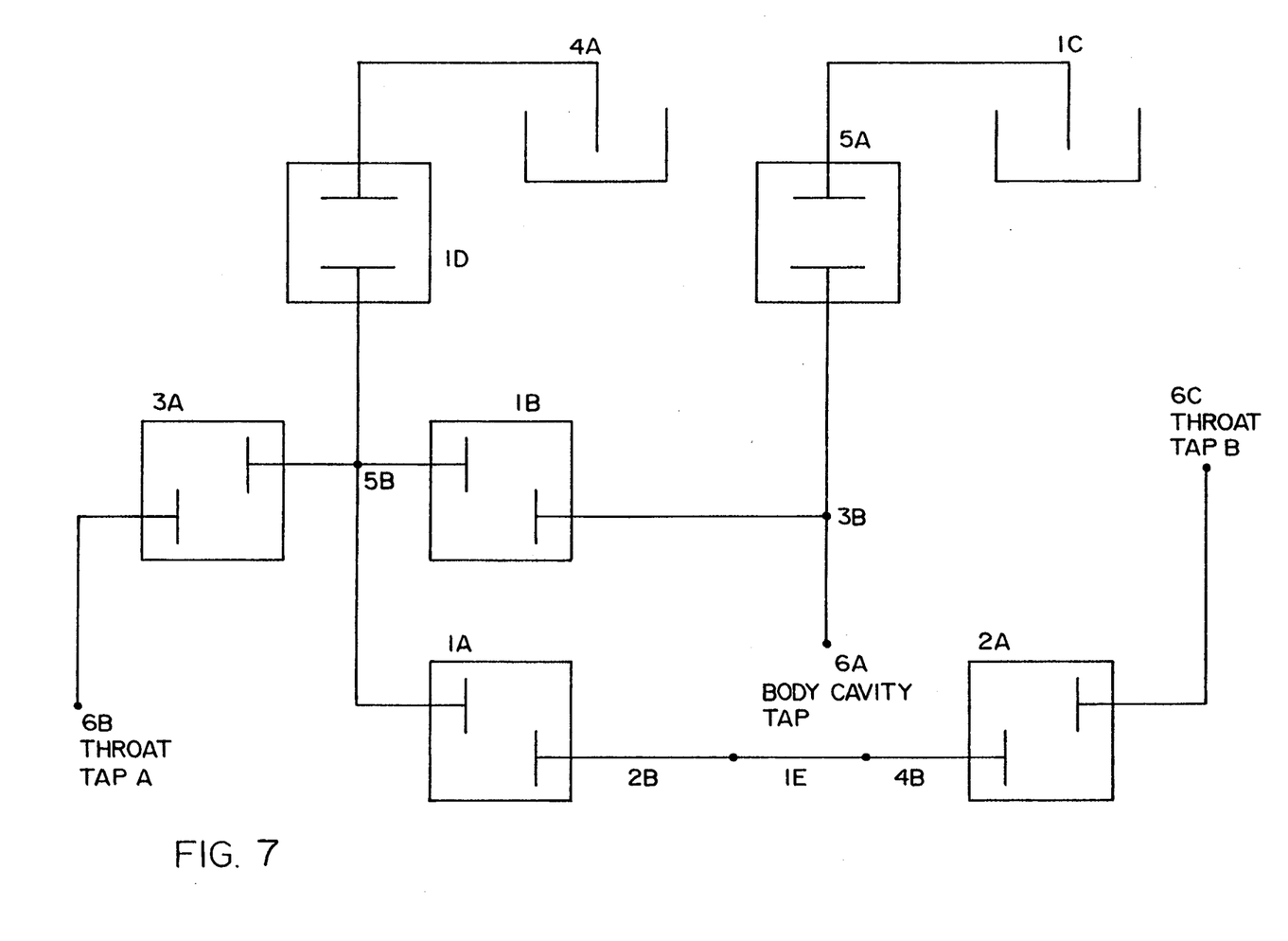
FIG. 7 is a schematic illustration of the standardized integral bleed system configuration of the preferred embodiment of the invention ready to be adapted to a variety of different configurations for pressure relieving flow.
Figure 8:
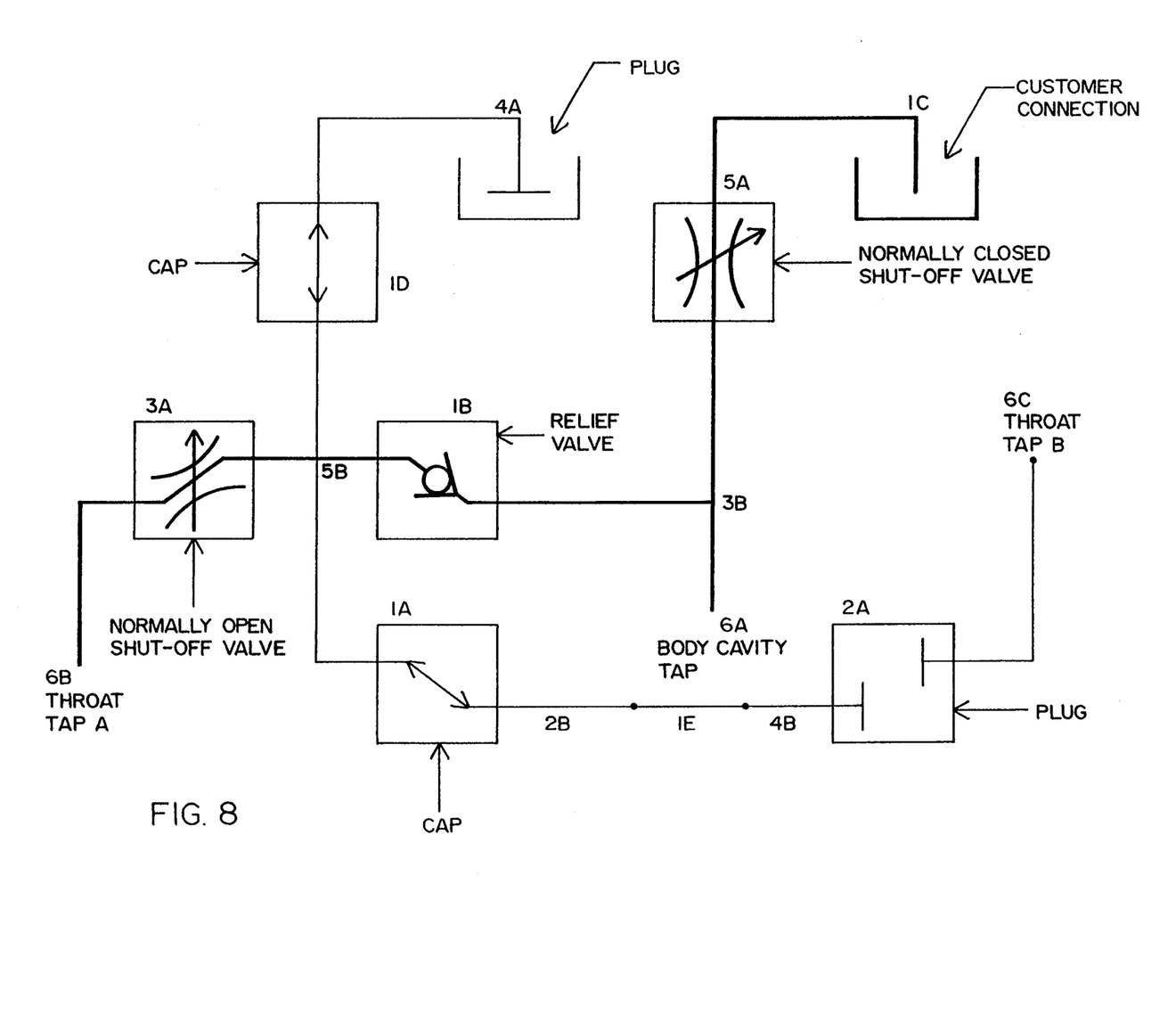
FIG. 8 is a schematic diagram similar to that of FIG. 7, but showing the standardized manifold configuration of the present invention configured for flow relief in a first configuration.

The manifold flow configuration of the integral bleed system block 75 of FIGS. 5, 6a, 6b and 6c is shown schematically in FIG. 7. As seen in FIG. 7, integral bleed system 75 is provided with a body cavity tap 6a, a throat tap 6b and a throat tap 6c. These three taps are apertures in the bottom surface of the integral bleed system, that is, the surface which mates with the body cavity and the throats of the valve 60. The various square boxes shown in FIG. 7 represent externally accessible ports which may be either capped or plugged or provided with a device such as a shut-off valve or a relief valve for configuring the manifold to provide pressure relief from a desired source to a desired drain as will be seen hereinafter. The straight lines between the various square boxes and the various taps shown in FIG. 7 represent flow channels which are provided internally within the integral body bleed system 75 of the present invention. Depending upon the desired bleed system configuration, some of the flow channels of the schematic of FIG. 7 receive fluid from a pressure source to delivery to a pressure drain and some of such flow channels are not used in various applications. FIG. 8 illustrates this feature.

In FIG. 8 a relief valve is provided at port 1b and a normally open shut-off valve is provided at port 3a, thus interconnecting body cavity tap 6a with throat tap 6b. In addition, a normally closed shut-off valve is provided at port 5a which is connected to a customer connection port 1c. The remaining ports of the integral body bleed system of the invention are either capped or plugged and are thus not used in the configuration of FIG. 8. Thus the configuration of FIG. 8 provides a relief flow configuration which permits pressure built up in the valve body cavity to exit through a throat tap which could, for example, be in fluid communication with the upstream side of the valve. It also permits selective flow of the fluid within the body cavity of the valve to a customer connected sensor for example through a normally closed shut-off valve which can be opened manually.

Figure 10:
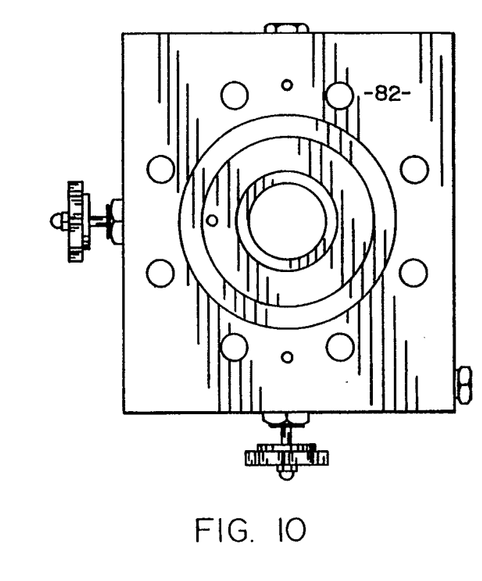
Figure 12:
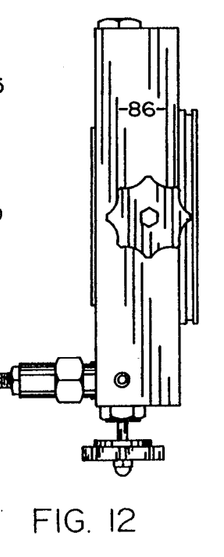
Figure 13:
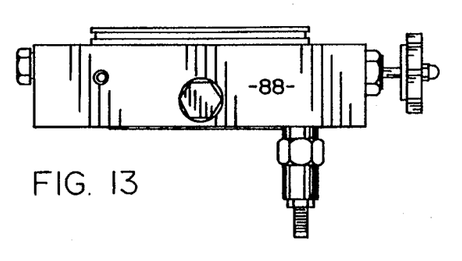

Integral body bleed system 75 of the present invention is shown configured in accordance with the schematic of FIG. 8 in the mechanical drawings of FIGS. 9–14. Each of FIGS. 9–14 illustrates an elevational view of one of the six external flat surfaces of the integral bleed system 75. Thus for example, FIG. 9 illustrates the top surface 80 of bleed system 75 which is essentially the same view of the manifold bleed system shown in FIG. 6, but prior to installation on the valve 60. On the other hand, FIG. 10 is a plan view of the bottom or interfacing surface 82 of manifold 75 and FIGS. 11–14 are respective side views of the manifold side surfaces 84, 86, 88 and 90, respectively.

FIGS. 9–14 show the manifold 75 configured for the release of pressure from the body cavity of valve 60 to one of the throat taps, namely, throat tap 6b as shown in FIG. 8. In addition, there is provision for the flow of fluid within the body cavity to a customer connection through a normally closed shut-off valve 5a. Thus, comparing FIG. 8 with FIGS. 9–14 one will observe that in port or aperture 3a seen in plan view in FIG. 11, there is a normally open shut-off valve positioned therein and in aperture or port 1b seen in plan view in FIG. 9, there is a relief valve installed therein. Furthermore it will be seen that in aperture or port 5a seen in plan view in FIG. 12 there is a normally closed shut-off valve installed therein for selective fluid flow to a customer connection at port 1c shown in FIG. 9. On the other hand, all of the remaining ports or apertures including 2a, 1a, 1d and 4a shown in the respective views of FIGS. 9-14, are either capped or plugged in this particularly configuration of the bleed system so that there is no flow into or out of such ports.

Figure 15:
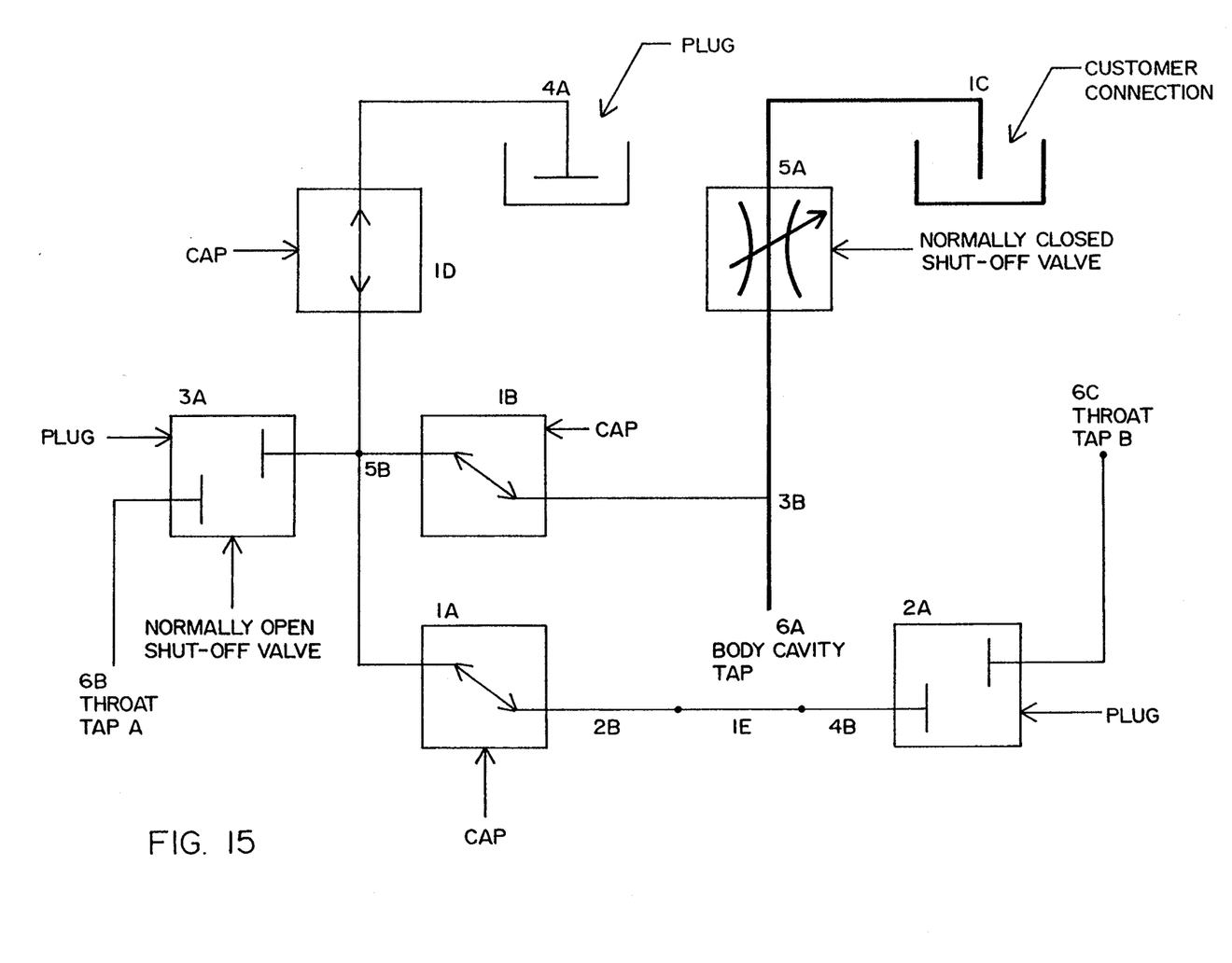
FIG. 15 is another schematic illustration of the manifold flow of the integral bleed system of the present invention in a second configuration.
Figure 16:
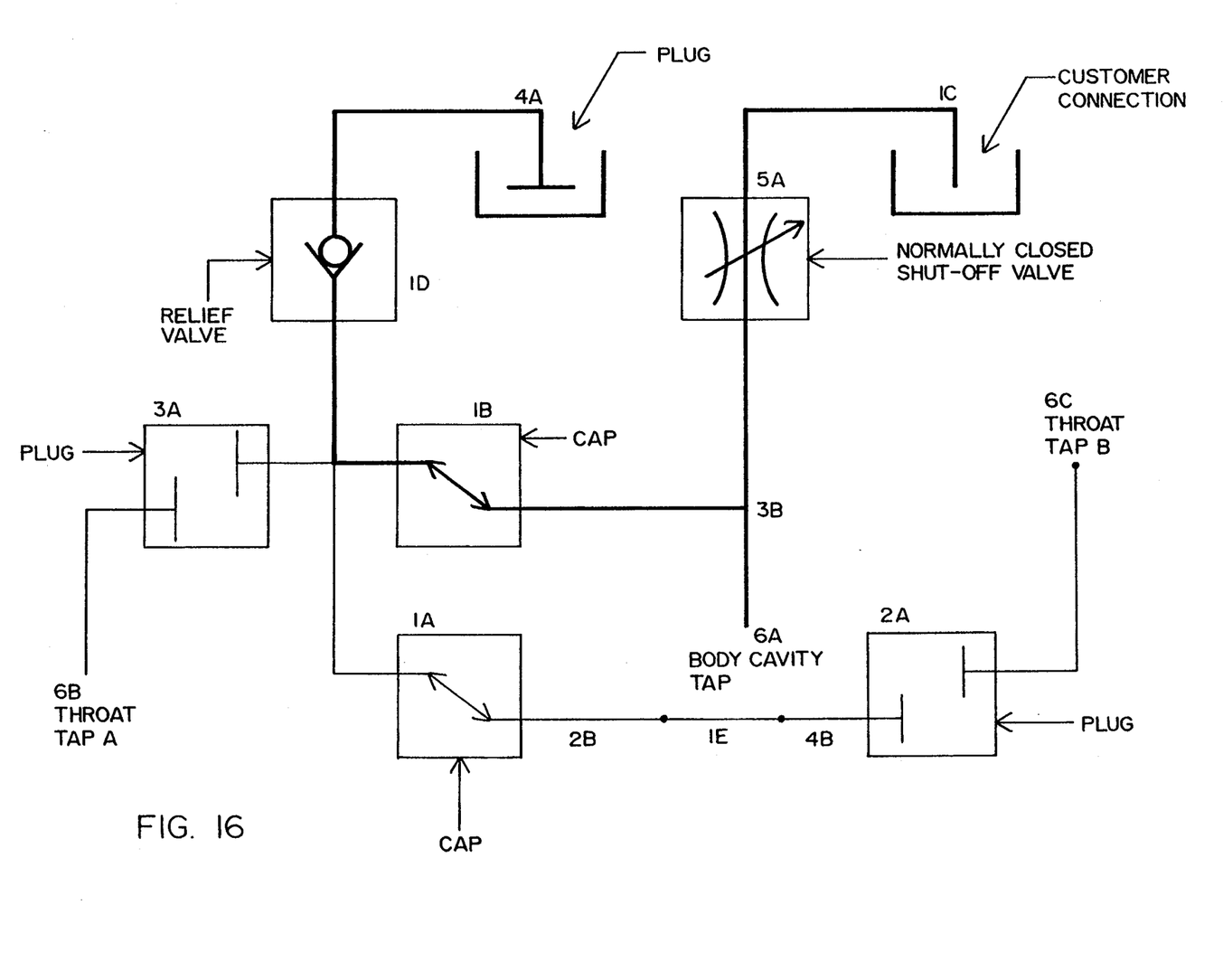
FIG. 16 is still another schematic illustration of the flow configuration of the present invention in a third configuration.
Figure 17:
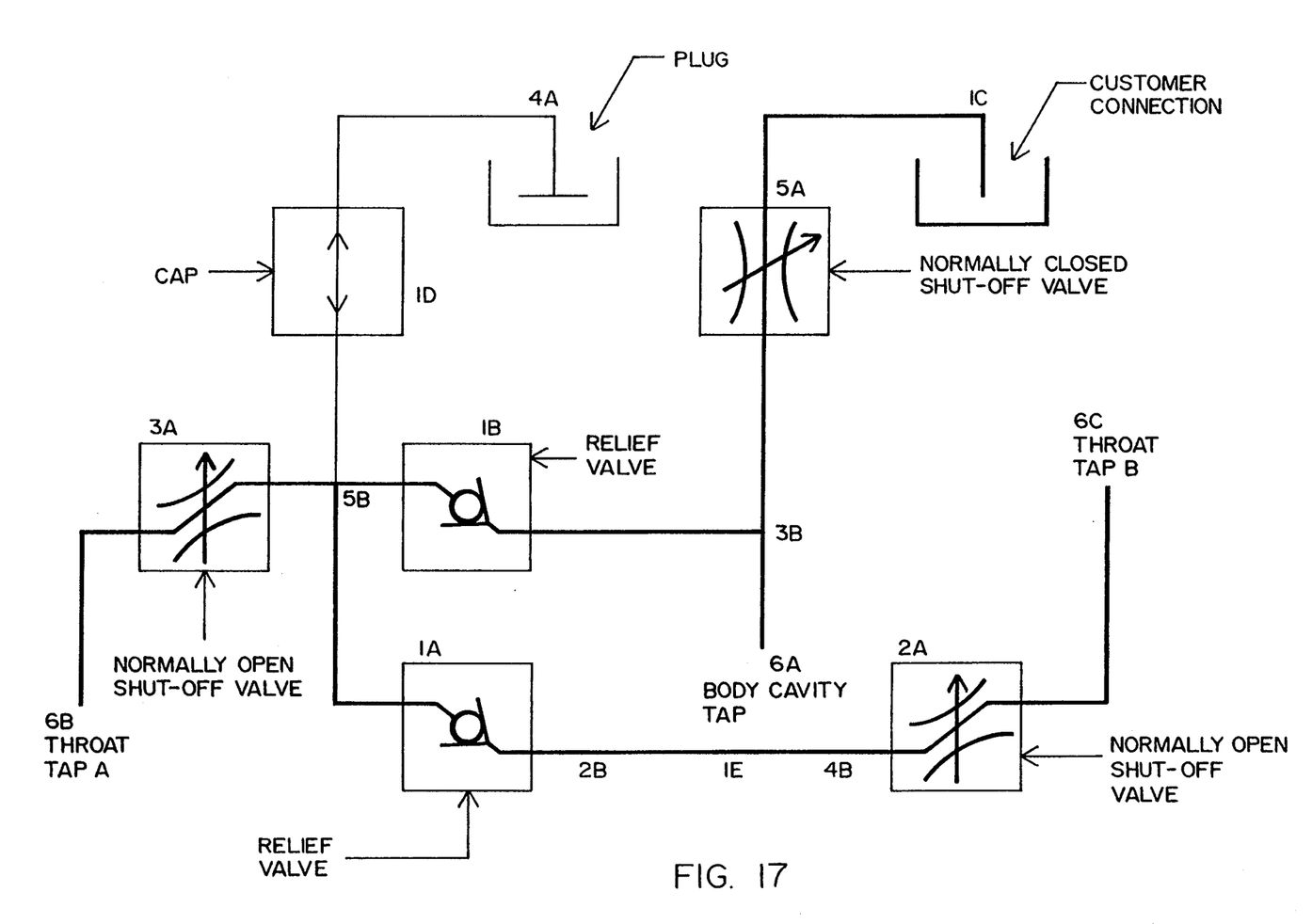
FIG. 17 is still an additional schematic illustration of the manifold of the present invention shown in a fourth alternative configuration.

Other configurations for the integral body bleed system 75 of the present invention are shown in FIGS. 15, 16 and 17, respectively. In each such case the direction of flow within the manifold 75 is a function of devices connected into the ports or apertures externally accessible along the various surfaces depicted in FIGS. 9-14. Thus by way of example in FIG. 15, the integral body bleed system 75 of the present invention is configured to permit only selective flow from the body cavity tap 6a to a customer connection at port 1c through a normally closed shut-off valve at port 5a. All of the other flow channels within the manifold 75 remain unused with appropriate plugs and caps installed in the remaining apertures.

In FIG. 16 the integral bleed system 75 of the present invention is configured to permit the flow shown in FIG. 15, but also to permit selective pressure relief to atmosphere through a relief valve installed in aperture or port 1d where it may be released through aperture or port 4a. In FIG. 17 the integral body bleed system 75 of the present invention is configured to permit flow from both throat tap b (port 6c) and the body cavity tap (port 6a) through respective relief valves in ports 1a and 1b into throat tap a (port 6b) as well as through a customer connection at port 1c by means of a normally closed shut-off valve installed in port 5a. To accomplish this flow configuration, a normally open shut-off valve is installed in port 2a as well as in port or aperture 3a and relief valves are installed respectively in ports 1a and 1b.

It is to be noted that in all such exemplary configurations of integral body bleed system 75 as depicted for example in FIGS. 8 and 15-17, there are no external plumbing tubes, pipes, elbows, tees, etcetera, required to be installed in the integral body bleed system 75 or anywhere else in valve 60 for that matter. All pressure relief flow occurs within the integral body bleed manifold which has internal channels through which all such flow occurs. There is a significant reduction in hardware extending externally of the combination of valve 60 and integral bleed system 75. Such external extensions are limited to accessible manual valve controls as well as fractional portions of relief valves and other such devices which extend beyond the surface of the aperture into which they are connected. Consequently there is a significant reduction in the complexity of the bleed system configurations necessary to serve all consumer needs for pressure relief flow. There is thus a several order of magnitude reduction in inventory control and commensurate savings in purchasing, shipping and the like, which generates a reduction in overall cost. There is also a significant reduction in clumsy protrusions which otherwise interfere with handling and shipping and thus a significant improvement in maintenance access as well. Most importantly, there is a significant reduction in the danger of severing an external pipe or fitting or of breaking a protruding device that one encounters with prior art conventional bleed systems. Thus there is a significant reduction in the probability of a severed bleed system part which could otherwise result in catastrophic failure in the form of fire, explosion, hazardous material spills and the like.

It will now be understood that what has been disclosed herein comprises a unified block integral bleed system for use with valves such as plug-type valves wherein pressure release flow occurs through a manifold port mounting arrangement which accesses upstream, downstream and body cavity portions of the valve and provides atmosphere taps as well without external piping. Such a manifold integral body bleed system provides internal flow channels and is preferably configured as the bonnet of the valve but could also be configured for example as the lower plate of the valve. In fact, any valve component which provides inherent access to the upstream and downstream throats and the central body cavity could serve as the bleed system manifold component as well. Thus the present invention should not be limited to the use of the manifold as the bonnet although that is the currently preferred embodiment of the invention and the best mode contemplated by the applicants herein at the present time.

Those having skill in the art to which the present invention pertains will now, as a result of the applicants' teaching herein, perceive various modifications and additions which may be made to the invention. By way of example, one such modification has already just been described, namely, the use of other valve components in which to integrate the manifold configuration of the present invention therefore to provide an integral body bleed system. Other such modifications can be perceived in the form of different generalized flow configurations from which selectively configured pressure release flow can be achieved by simply plugging or capping various orifices externally available to the user while installing various pressure relief flow devices in the others including manual valves and relief valves and the like. Accordingly, all such modifications and additions are deemed to be within the scope of the invention which is to be limited only by the claims appended hereto and their equivalents.

We claim:

1. A fluid flow control valve of the type having upstream and downstream throats separated by a central body cavity having a fluid control member connected to a trunnion for selectively opening and closing said valve; the valve comprising:
an integral bleed system manifold connected integrally to said throats and said cavity and having interior flow channels, a plurality of externally accessible ports in fluid communication with respective ones of said flow channels, and at least one flow control device for selectively interconnecting a) said upstream and downstream throats while bypassing said cavity; b) said upstream throat and said cavity; and c) said downstream throat and said cavity; said manifold being configured for receiving said trunnion and for forming an enclosing surface of said cavity.

2. The integral bleed system recited in claim 1 wherein said manifold block is configured as the bonnet of said valve.

3. The integral bleed system recited in claim 1 wherein said ports are configured to provide valve pressure release flow from said central body cavity to said upstream throat.

4. The integral bleed system recited in claim 1 wherein said ports are configured to provide valve pressure release flow from said central body cavity to said downstream throat.

5. The integral bleed system recited in claim 1 wherein said ports are configured to provide valve pressure release flow from said downstream throat to said upstream throat.

6. The integral bleed system recited in claim 1 wherein said ports are configured to provide valve pressure release flow from said upstream throat to said downstream throat.

7. The integral bleed system recited in claim 1 wherein said ports are configured to provide valve pressure release flow from said central body cavity to the exterior of said valve.

8. The integral bleed system recited in claim 1 wherein said ports are configured to provide valve pressure release flow from said downstream throat to the exterior of said valve.

9. The integral bleed system recited in claim 1 wherein said flow control device is a manual flow control shut-off valve.

10. The integral bleed system recited in claim 1 wherein said flow control device is a relief valve.

* * * * *